United States Patent Office 2,823,178
Patented Feb. 11, 1958

2,823,178

PROCESS OF TREATING SULPHITE WASTE

John J. Ritter, Seattle, Wash.

No Drawing. Application March 5, 1956
Serial No. 569,259

4 Claims. (Cl. 204—131)

This invention relates to a process of treating sulphite waste and this application is a continuation-in-part of my prior application Serial Number 304,642, filed August 15, 1952, now abandoned.

An object of this invention is to provide a new and useful electrolytic process of recovering, separating and extracting lignin and its associated products from the material known as sulphite waste which results from reactions undergone in the sulphite process of paper pulp manufacture.

Another object of this invention is to separate and remove lignin or its modified form from sulphite waste in the form of calcium ligno-sulphonate and anode-metal ligno-sulphonate.

A further object of this invention is to convert lignin and its associated products into a physical form and condition capable of being easily removed from the sulphite waste solution and successfully recovered as a tangible and valuable product and to render the sulphite waste liquid innocuous so that it can be safely discharged into streams and like surface waters.

A further object is to provide a chemical reduction process suitable to hydrogenate or deoxidize the lignin component of calcium lignin sulphonate as well as to saturate its base metal component by treating the sulphite waste as an electrolytic bath wherein a metal of high electromotive force is dissolved at the positive pole and hydrogen at an overvoltage on zinc or other metal of similar characteristics is evolved at the negative pole, the metal and hydrogen ions both being highly chemically reactant to effect hydrogenation of the lignin and also to reduce the valence of the metal component.

Other objects of the invention will be apparent from the following description.

Lignin and its associated products resulting from the sulphite process of extraction are quite susceptible to reduction, either by hydrogenation or by deoxidation. It is hereby proposed to employ an electrolytic process wherein both electrodes are in intimate contact with the sulphite waste products and to use active reducing agents, such as electropositive anodes of metal classed above hydrogen, which is rated zero for scaling purposes in the electromotive force series activity lists. As an illustrative listing of electromotive force series of elements reference is made to page 1575 of the Handbook of Chemistry and Physics, 34th edition, 1952–1953, published by Chemical Rubber Company of Cleveland, Ohio. Any metal rated above hydrogen in this list may be used for anode purposes, except the pure forms of the alkali metal group, namely sodium, potassium, lithium and rubidium, which oxidize in air too readily and are too violent in contact with water. Iron, magnesium, aluminum, zinc and their alloys have been found to be practicable anode metals. The cathodes may be of any metal or alloy of metals, either electropositive or electronegative, except the metals just hereinbefore mentioned as oxidizing too readily in air and being too violent in water. One satisfactory cathode metal is zinc, which has a high hydrogen over-voltage and is highly effective in the reduction.

The reducing action of the above mentioned metals and nascent hydrogen applies to ionized and un-ionized substances in solution, miscible components and solids in suspension, thus affecting all of the materials which are subject to reduction. In practice, this process of reduction occurs before any coagulation takes place. The choice of metals used as anodes will be governed by several considerations among which are cost of the metal, specific ability to coagulate the substances being treated and ability to produce coagulations having a desired base element including the exclusion from coagulations of elements which would be objectionable in the recovered product. Alloys of the metals used for anode purposes offer certain advantages, such as a wider range of coagulation and aiding in the solution of the metal. For instance, it has been found carbon steel dissolves more readily than wrought iron.

By way of example, the treatment of the sulphite waste may be batch treatment in a vat or like receptacle or continuous flow treatment in a trough or conduit through which the sulphite waste moves progressively. In either instance one or more anodes formed of metal high in the electromotive force series, such as iron, aluminum, magnesium, zinc or alloys of these and other electropositive metals, and one or more hydrogen evolving cathodes of metals, such as zinc, iron, copper, aluminum or the like, are positioned so that they will be in direct contact with and immersed in the same body of sulphite waste. Different metals or alloys may be used as anodes in the same vat or conduit. The sulphite waste usually comes from the mill at a temperature of about 140 degrees Fahrenheit and I prefer to start the treatment at about this temperature because electrical resistance is less at higher temperatures. However the treatment may be successfully carried out at lower temperatures including normal cold water temperature. As an initial step in the treatment the sulphite waste is alkalized sufficiently to produce a visible discoloration and a slight precipitate by adding a small amount of alkalizing agent such as KOH, NaOH, NH₄OH or CaOH. The visible discoloration and precipitate will occur at a pH ranging from 7.0 to 7.5 and both will disappear later under the reducing action. The concentration of the sulphite waste at the start is usually about twelve percent. This concentration is not critical and it may vary due to different mill procedures and due, sometimes, to the addition of fiber wash water. The waste solution is placed or led between the opposed electrodes which have at least two volts of direct current applied with a current density of approximately thirty six amperes per square foot. About fifteen minutes elapses before any apparent change takes place, after which frothing and coagulation commence. The time of treatment is approximately one hour, depending on the initial concentration. Some of the coagulation adheres to the anode, some settles and some rises in the froth, all of which can be collected. The adherence to the anode varies with different metals, with iron it is considerable and needs to be scraped off or a reversal of polarity will cause it to drop off. With aluminum very little adherence occurs. The amount of metal dissolved at the anode is definitely an electrochemical equivalent. In practice it requires about two grams of iron to obtain twenty grams of dehydrated coagulate. About one gram of aluminum will obtain the same amount of dehydrated coagulate. The dissolution of the anode requires its frequent replacement.

The sulphite waste is a good electrical conductor although a trace of an active ionizing salt, such as sodium chloride or sodium sulphate may be added to increase the anode dissolution rate. The visible indications when the solids have been completely extracted are several; when using aluminum as an anode the froth at first is grayish and becomes white toward the end; when using iron the anode emits oxygen at the end; when using aluminum the normal amber color of the sulphite waste solution disappears toward the end.

The anode ions can not enter the solution without first engaging acids or oxygen, which involves reduction, primarily, as well as a reduction in the valence of the initial metal component. The oxidation products and the reduced valence combinations set up coagulation, depending also on the particular anode metal used. By using a sectional running trough method in which the sulphite waste is passed successively from one trough to another various degrees and modifications of lignin and its related substances are recovered due to their different tendencies to become insoluble in sequence. The principal coagulations are two or more basic compounds; calcium lignosulphonate and anode-metal ligno-sulphonate. Other ligneous compounds may result, depending on the state of the lignin in the sulphite waste.

Obviously changes in this invention may be made within the scope of the following claims.

I claim:

1. The process of treating lignin and its associated products which have resulted from the reactions undergone in the sulphite method of paper pulp manufacture for the purpose of deoxidizing such products, which comprises adding an alkali in sufficient quantity to the sulphite waste solution to cause a visible discolored suspension and a slight precipitate; and then subjecting the alkalined sulphite waste to electrolysis at not less than two volts between a positive electrode of high electromotive force and a hydrogen evolving negative electrode in a single compartment in which both electrodes are in direct and intimate contact with the sulphite waste products, whereby the oxygen concentrated at the positive electrode under electrolytic pressure is neutralized by the ionic products of the dissolving positive electrode and the nascent hydrogen ionic products emanating from the negative electrode thereby effecting a reduction in the condition of the lignin and its associated products.

2. The process of treating lignin and its associated products which have resulted from the reactions undergone in the sulphite method of paper pulp manufacture for the purpose of deoxidizing such products, which comprises adding an alkali in sufficient quantity to the sulphite waste solution to alkalize the same to a pH of 7.0 to 7.5 and cause a visible discolored suspension and a slight precipitate; and then subjecting the alkalined sulphite waste to electrolysis at not less than two volts between a positive electrode comprising a metal higher than hydrogen in the electromotive force series and a hydrogen evolving negative electrode in a single compartment in which both electrodes are in direct and intimate contact with the sulphite waste products, whereby the oxygen and acids concentrated at the positive electrode under electrolytic pressure are neutralized by the ionic products of the dissolving positive electrode and the nascent hydrogen ionic products emanating from the negative electrode thereby effecting a reduction in the condition of the lignin and its associated products.

3. The process of hydrogenating and saturating lignin and its associated products which have resulted from reactions undergone in the sulphite method of paper pulp manufacture to render them insoluble and separable and capable of recovery, which comprises adding an alkali in sufficient quantity to the sulphite waste solution to alkalize the same to a pH in the order of 7.0 to 7.5 and cause a visible discolored suspension and a slight precipitate; and then subjecting the alkalined waste solution to electrolysis at not less than two volts and at a current density of approximately thirty six amperes per square foot of electrode surface between a positive electrode comprising a metal higher than hydrogen in the electromotive force series and a hydrogen evolving negative electrode in a single compartment in which both electrodes are in direct and intimate contact with the sulphite waste products, whereby the oxygen and acids concentrated at the positive electrode under electrolytic pressure are neutralized and saturated by the ions of the dissolving positive electrode and the products resulting from hydrogenation and whereby the hydrogenated products and basically saturated salt products are coagulated in the alkalined solution.

4. The process of deoxidizing ligno-sulphonic acid which is compounded with a base element and dissolved in the water solution which has resulted from reactions undergone in the sulphite process of paper pulp manufacture for the purpose of rendering said compound insoluble and separable from the water solution and to reduce the ligno-sulphonic acid, comprising adding an alkali in limited quantity to the solution to alkalize said solution to a pH in the order of 7.0 to 7.5 and cause visible discoloration and produce a slight but non-permanent precipitate; and then subjecting the alkalized solution to direct current electrolysis between a positive electrode formed of a metal having a higher rating than hydrogen in the electromotive force series and a hydrogen evolving negative electrode at not less than two volts and at a current density of approximately thirty six amperes per square foot of electrode surface with the electrodes and solution in a single compartment and with both electrodes in direct and intimate contact with the solution, whereby oxygen and acids concentrated at the positive electrode under electrolytic pressure are neutralized by ions of the dissolving positive electrode and the products resulting from hydrogenation occurring at the negative electrode and whereby the hydrogenated products and basically saturated salt products are coagulated in the said alkalined solution, said coagulated matter containing anode metal and hydrogen in combination with the original base element.

References Cited in the file of this patent

UNITED STATES PATENTS

| | | |
|---|---|---|
| 2,318,919 | Brockman | May 11, 1943 |
| 2,743,220 | Estes | Apr. 24, 1956 |